UNITED STATES PATENT OFFICE.

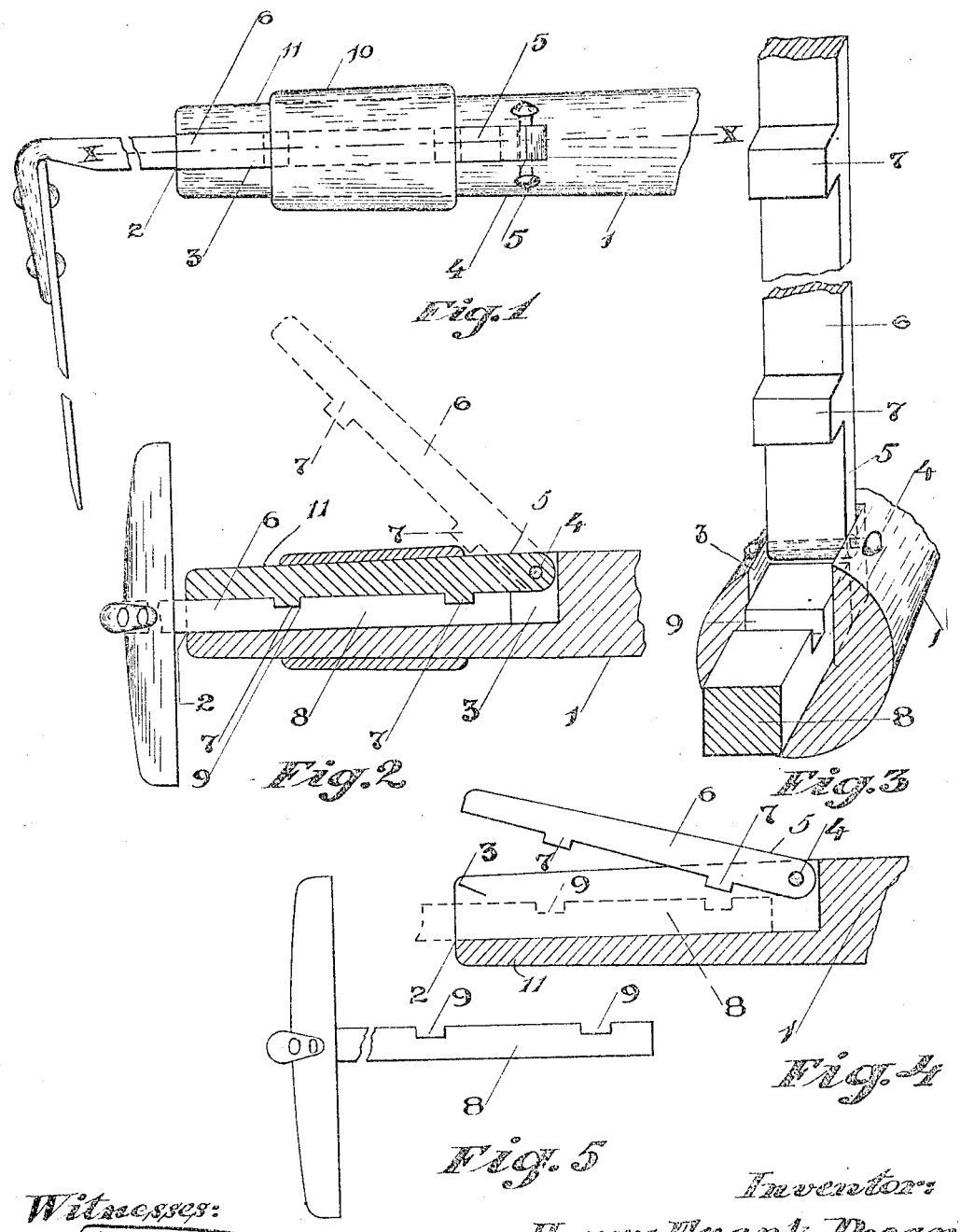

HENRY FRANK POCAN, OF STEPHENSON, MICHIGAN.

DETACHABLE TOOL-HANDLE.

No. 904,012.  Specification of Letters Patent.  Patented Nov. 17, 1908.

Application filed June 6, 1908. Serial No. 437,045.

*To all whom it may concern:*

Be it known that I, HENRY FRANK POCAN, a citizen of the United States, residing at Stephenson, county of Menominee, and State of Michigan, have invented certain new and useful Improvements in Detachable Tool-Handles, of which the following is a specification.

My invention relates to tool handles, and particularly to that class in which the tool and handle are made detachable.

The object of my invention is to provide a handle as mentioned, which will securely and rigidly hold the properly shaped shank of a tool such as a hoe, spade, etc., in such a manner that the tool may be quickly and readily detached if desired and another one secured in its place just as readily and quickly.

A further object of my invention is to provide a device as mentioned, which shall be strong and durable, simple of construction, hence of low cost to manufacture.

With these objects in view, my invention consists generally in an ordinary tool handle the forward end of which is provided with a longitudinal recess and a member hingedly mounted in said recess, said member being provided with a plurality of lugs.

My invention further consists in a tool shank properly shaped and provided with a plurality of transverse slots, the recess in said tool handle being adapted to receive said shank, and the slots in said shank being adapted to receive the lugs on said hinged member of the tool handle, said shank being locked in position by a sleeve.

My invention will be more readily understood by reference to the accompanying drawings forming a part of this specification, and in which, Figure 1 is a side elevation of my device in its preferred form, Fig. 2 is a section on substantially the line *x—x* of Fig. 1, Fig. 3 is a detail perspective view of my device, Fig. 4 is a detail sectional view of the handle portion of my device, the tool shank being shown in dotted lines, and Fig. 5 is a detail of the tool detached.

Referring now to the drawings, 1 indicates the ordinary handle of a tool, such as a spade, hoe or the like. Extending from the lower end 2 of the handle 1, is a longitudinal recess 3 which is of any suitable length. The recess 3 may be of any suitable shape in cross-section other than circular, but as I have shown in the accompanying drawings, is preferably rectangular. Hingedly secured preferably by a bolt 4, to the member 1 in the recess 3 preferably near the rearward end of said recess as at 5, is a member 6. Said member 6 is of substantially the same length and width as the recess 3 and preferably of a thickness equal to half the depth of said recess. The member 6 is provided with a plurality of transversely extending lugs 7, said lugs being of any suitable shape. The rearward portion of the shank 8 of the tool to be used is of substantially the same shape as the member 6, and is provided with a plurality of transverse slots 9, said slots being so positioned and shaped as to receive the lugs 7 on said member 6.

In attaching the tool to the handle, the shank 8 is placed in the bottom of the recess 3, as shown in Figs. 2 and 3 and in dotted lines in Fig. 4 in the drawings, in such a position as to receive the lugs 7 of the member 6. To facilitate securely locking said members together when in position, I provide a preferably substantially cylindrical sleeve 10, said sleeve being adapted to fit snugly, hence may be locked to the slightly tapered end portion 11 of the handle 1.

It is obvious that with this sort of a handle, any tool having its shank properly shaped and slotted as described, may be as rigidly secured to said handle as though it were formed integrally therewith.

Having described my invention what I claim as new, and desire to secure by Letters Patent, is:

1. A tool having a shank, in combination with a tool handle having a longitudinal recess, a member hingedly mounted in said recess, a plurality of lugs on said hinged member, said shank being provided with corresponding slots to receive said lugs and a sleeve holding said tool shank and hinged member in locked position in said recess, substantially as described.

2. A tool, having a shank, in combination with a tool handle having a longitudinal recess extending from its forward end, a member hingedly mounted in the rear end of said recess, a plurality of lugs on the under-surface of said hinged member, said shank being provided with a plurality of slots to receive said lugs, a sleeve, the inner surface of said sleeve being of substantially the same shape and diameter as the forward end portion of said tool handle, and said sleeve securely holding said shank and hinged member in locked position in said recess, substantially as described.

3. A tool having a shank, in combination with a tool handle, the forward end portion of said handle being tapered and provided with a longitudinal recess, a member of substantially the same width and length as said recess and hingedly mounted therein, a plurality of transverse lugs on said hinged member, the rearward end portion of said shank being of substantially the same shape as said hinged member and provided with a plurality of transversely extending slots to receive the lugs on said hinged member, and a sleeve fitting snugly upon the tapered end portion of said tool handle to securely hold said shank and hinged member in locked position in said recess, substantially as described.

In testimony whereof I have signed my name to this specification in the presence of two subscribing witnesses.

HENRY FRANK POCAN.

Witnesses:
 GEORGE BARSTOW,
 ALBERT G. LARSON.